(12) United States Patent
Williams

(10) Patent No.: US 8,011,849 B2
(45) Date of Patent: Sep. 6, 2011

(54) CORNER CONNECTOR

(76) Inventor: Douglas Williams, Northbrook, IL (US)

( * ) Notice: Subject to any disclaimer, the term of this patent is extended or adjusted under 35 U.S.C. 154(b) by 343 days.

(21) Appl. No.: 12/109,106

(22) Filed: Apr. 24, 2008

(65) Prior Publication Data

US 2009/0269130 A1 Oct. 29, 2009

(51) Int. Cl.
*F16B 12/46* (2006.01)
(52) U.S. Cl. ........ 403/403; 403/188; 403/169; 403/231; 52/256
(58) Field of Classification Search .......... 403/187, 403/188, 169, 170, 171, 179, 231, 403; 211/182; 312/140, 265.1, 265.2, 265.3, 265.4, 265.5, 312/265.6; 52/256, 287.1, 276
See application file for complete search history.

(56) References Cited

U.S. PATENT DOCUMENTS

| | | | |
|---|---|---|---|
| 2,914,936 A | 12/1959 | Reinold | |
| 3,204,300 A | 9/1965 | Hoffmann | |
| 3,253,842 A | 5/1966 | Rabe | |
| 3,274,624 A | 9/1966 | Noerdinger | |
| 3,304,676 A * | 2/1967 | Sallie et al. | 52/276 |
| 3,557,413 A | 1/1971 | Engle | |
| 4,027,452 A | 6/1977 | Donnell | |
| 4,067,155 A * | 1/1978 | Ruff et al. | 52/287.1 |
| 4,325,044 A | 4/1982 | Ehrgott et al. | |
| 4,385,850 A * | 5/1983 | Bobath | 403/403 |
| 4,429,438 A | 2/1984 | Takeshima et al. | |
| 4,477,201 A * | 10/1984 | Yoshiyuji | 403/231 |
| 4,555,255 A | 11/1985 | Kissel | |
| 4,689,930 A * | 9/1987 | Menchetti | 52/276 |
| 4,691,373 A | 9/1987 | Ausnit | |
| 4,731,911 A | 3/1988 | Gould | |
| 5,065,559 A | 11/1991 | Zegel et al. | |
| 5,114,265 A | 5/1992 | Grisley | |
| 5,149,108 A | 9/1992 | Leiszter | |
| 5,351,369 A | 10/1994 | Swain | |
| 5,357,728 A | 10/1994 | Duncanson | |
| 5,588,187 A | 12/1996 | Swain | |
| 5,611,185 A | 3/1997 | Wilz | |
| 5,614,232 A | 3/1997 | Torigoe et al. | |
| 5,644,878 A | 7/1997 | Wehrmann | |
| 5,676,486 A | 10/1997 | Keith | |
| 5,699,601 A | 12/1997 | Gilliam et al. | |
| 5,791,810 A | 8/1998 | Williams | |
| 6,094,879 A | 8/2000 | Dickeduisberg | |
| 6,146,048 A | 11/2000 | Stibolt | |

(Continued)

FOREIGN PATENT DOCUMENTS

DE 1112446 8/1961

(Continued)

*Primary Examiner* — Michael P Ferguson
(74) *Attorney, Agent, or Firm* — Lempia Summerfield Katz LLC

(57) ABSTRACT

A corner connector device has outside and inside connector components each having a length. The outside component has first and second legs integrally connected along a lengthwise seam. The outside connecter component has an outside connector that extends lengthwise along the seam and projects from an outside surface. The inside connector component has third and fourth legs integrally connected along a lengthwise seam. The inside connector component has an inside connector that extends along the seam and projects from an inside surface. The inside and outside connectors can be lengthwise connected to and disconnected from one another with surfaces of the connector components spaced a distance from one another. Panels meeting at a corner can be captured between the spaced surfaces of the two connector components.

22 Claims, 13 Drawing Sheets

U.S. PATENT DOCUMENTS

| | | |
|---|---|---|
| 6,205,732 B1 | 3/2001 | Rebman |
| 6,209,275 B1 | 4/2001 | Cates et al. |
| 6,217,251 B1 | 4/2001 | Kato et al. |
| 6,647,679 B2 * | 11/2003 | Belleau .................. 52/287.1 |

FOREIGN PATENT DOCUMENTS

| | | |
|---|---|---|
| FR | 1176188 | 4/1959 |
| GB | 943668 | 12/1963 |
| SU | 1624218 | 1/1991 |

* cited by examiner

CORNER CONNECTOR

BACKGROUND

1. Field of the Disclosure

The present disclosure is generally directed to connectors for mounting wall and ceiling panels and tiles, and more particularly to corner connectors for mounting and joining such panels where they meet in two different planes at a corner.

2. Description of Related Art

A number of devices and systems are known in the art that mount and support suspended or dropped ceiling panels, ceiling tiles, acoustical tiles, wall panels, or the like. These devices generally are configured having distinctive features that are specific to a particular panel structure or application. Once installed, most known devices and systems are difficult to disassemble or make it difficult to remove and replace individual panels. Some prior art devices have parts that fasten to each other and/or to other components to support a panel. This can make it difficult or impossible to disassemble, uninstall, and reuse the parts.

Often, walls or ceilings have obstructions that are displaced from the plane of the surface. These often include water pipes, steam pipes, electrical conduit, air ducts, and the like. Known panel mounting systems and devices are not configured to accommodate such structures and obstacles. The obstructions are typically enclosed using non-removable materials such as sheetrock, panel-board or plywood. Sometimes, permanent grid systems can be cut, shaped, and riveted or fastened in place in a manner to mount panels that enclose the obstruction. However, the systems and components are difficult to install in such a manner, and make it time consuming to do so.

In some cases, the fastening mechanisms employ a male and a female section or compatible sections that connect to one another without the use of fasteners. Typical prior known devices of this type are designed to suspend or mount ceiling or wall panels within in a single plane such as on a flat ceiling or a flat wall.

U.S. Pat. No. 5,791,810 (Williams) discloses a detachable panel support device for two-dimensional or flat, single plane applications. In particular, the Williams connector has a first connector section and a second connector section, each with extending elements protruding from the section. The extending elements of the two sections join together or interlock with one another and create spaces between the joined sections to capture panels. The Williams connecting device can form a reusable and continuous joint along each pair of mated sections to support panels. However, the Williams device is applicable to flat or two-dimensional walls or ceilings. U.S. Pat. No. 6,205,732 B1 (Rebman) describes a grid system for mounting and supporting ceiling tiles in a two-dimensional suspended or dropped ceiling. The parts of the grid system snap together with male and female components.

Other connecting devices in the prior art are known that can accommodate a specific corner application to connect adjacent panels at a corner. For example, U.S. Pat. No. 5,676,486 (Keith) discloses a one-piece corner connector configured to join panels at an interior corner, i.e., a 90° corner. The Keith device is formed as a one piece structure configured to join side edges of two rectangular panels that meet in a corner and is sized for panels of a specific thickness.

U.S. Pat. No. 5,065,559 (Zegel et al.) discloses a two-dimensional wall system with locking connectors and vertical supports. Panels are mounted via fasteners to the supports. The corner pieces of the Zegel et al. system are internal to the corner and the panels fasten to an exterior surface of the pieces.

Other prior art connectors attempt to solve the problem of economically joining panel supports at corners and yet maintaining an esthetically pleasing look. U.S. Pat. No. 6,094,879 (Dickeduisberg) describes a resilient corner configured to join two adjacent L-shaped channels end to end at an angle. The connectors are separate from the channels. U.S. Pat. No. 4,027,452 (Donnell) discloses an interior molding to join wall paneling at an interior corner. The molding is a single unitary device secured to the walls in the corner and is sized to accept a specific panel thickness.

U.S. Pat. No. 6,209,275 B1 (Cates et al.) discloses a wall system. Cates has corner pieces that are configured to mate with panels specific to the system. The Cates device requires numerous components and would be complex to install and assemble. U.S. Pat. No. 4,555,255 (Kissel) describes an invertible corner-connecting clip which fits a right or left-hand corner.

Additional interlocking connecting structures are also known in the art to included projecting and interlocking elements. U.S. Pat. No. 6,217,251 B1 (Kato et al.) describes a joining device for connecting to elements end to end. An additional third hollow joint attaches over the joined ends to retain the connection. U.S. Pat. No. 5,614,232 (Torigoe et al.) discloses an apparatus for producing a fastener with interlocking projections.

SUMMARY OF THE DISCLOSURE

The present invention is for a corner connector structure or device that employs two elongate connecting components or strips that can support ceiling panels, ceiling tiles, acoustic tiles, wall panels, or the like at virtually any type of corner. The disclosed device includes an inside corner strip and an outside corner strip that can be connected with one another. When connected, the strips create spaces between the two strips to capture, retain, and support a tile, panel, or the like. The inside and outside corner strips have extending connecting flanges that fit together to join the strips. The present device is configured so as to permit the inside and outside strips to be easily engaged or assembled and disengaged or disassembled. Furthermore, the connecting flanges are configured to permit adjustment of the panel space so as to accommodate panels of different thicknesses.

In the present example, the corner connector device comprises an outside connector component and an inside connector component. The outside component has a length and, when viewed in cross-section, a first leg and a second leg. The first leg integrally connects to the second leg along a lengthwise seam and forms a channel. The first and second legs each have an inside surface oriented relative to one another at an angle W of less than 180 degrees and an outside surface oriented relative to one another at an angle X of more than 180 degrees. The outside component also has an outside connector that extends lengthwise along the outside component parallel to the seam and projects from one of the outside surfaces. The inside connector component has a length and, when viewed in cross section, a third leg and a fourth leg. The third leg integrally connects to the fourth leg along a lengthwise seam and forms a channel. The third and fourth legs each have an inside surface oriented relative to one another at an angle Y of less than 180 degrees and an outside surface oriented relative to one another at an angle Z of more than 180 degrees. The inside component also has an inside connector that extends lengthwise along the inside component parallel to the seam and projecting from one of the inside surfaces. The inside and outside connectors can be lengthwise selectively connected to and disconnected from one another with confronting parts of the outside surfaces of the outside connector component and inside surfaces of the inside connector component spaced a distance from one another.

In one embodiment, the outside connector has a pair of outside connector flanges that are lengthwise spaced apart, and the inside connector has an inside connector flange that interferingly fits between the pair of outside connector flanges when the inside and outside connectors are connected.

In one embodiment, the inside connector has a pair of inside connector flanges that are lengthwise spaced apart, and one outside connector flange that interferingly fits between the pair of inside connector flanges when the inside and outside connectors are connected.

In one embodiment, each of the outside and inside connector flanges has a stem section connected to the respective outside and inside connector component and has a head extending along a free edge of the stem section, and each head has a thickness that is greater than a thickness of the corresponding stem section.

In one embodiment, a spacing between a pair of outside connector flanges matches the head thickness of an inside connector flange.

In one embodiment, each head has a rounded tip and ramps that transition from sides of the head to adjacent side surfaces of a corresponding stem section.

In one embodiment, the angles W and Y are about 90° and the angles X and Z are about 270° on each of the respective inside and outside connector components.

In one embodiment, the outside connector component has a fastener groove extending lengthwise along each of the outside surfaces of the first and second legs and the inside connector component has a fastener groove extending lengthwise along each of the inside surfaces of the third and fourth legs.

In one embodiment, the inside surfaces of the first and second legs on the outside connector component are mounted to an exposed, outer corner of a structure with an angle of more than 180 degrees, and the inside connector component is connected to the outside connector component.

In one embodiment, the outside surfaces of the third and fourth legs on the inside connector component are mounted to an exposed, inner corner of a structure with an angle of less than 180 degrees, and the outside connector component is connected to the inside connector component.

In one embodiment, the inside connector has a pair of inside connector flanges that are lengthwise spaced apart, and the outside connector has at least one outside connector flange that interferingly fits between the pair of inside connector flanges when the inside and outside connectors are connected.

In one embodiment, a panel structure is captured between the outside surface of the first leg and the inside surface of the third leg, and another panel structure is captured between the outside surface of the second leg and the inside surface of the fourth leg.

In one embodiment, each of the inside and outside connector flanges has a stem section connected to the respective inside and outside connector component and a head extending along a free edge of the stem section. Each head can further have a thickness that is greater than a thickness of the corresponding stem section.

In one embodiment, the outside connector can have three outside connector flanges that are lengthwise spaced apart, and an inside connector flange can interferingly fit between adjacent ones of the three outside connector components.

In one embodiment, the inside connector can have three inside connector flanges that are lengthwise spaced apart, and an outside connector flange can interferingly fit between adjacent ones of the three inside connector flanges.

In one embodiment, the distance between confronting parts of the outside surfaces of the outside connector component and inside surfaces of the inside connector component can be adjusted between a minimum panel thickness and a maximum panel thickness position.

In other embodiments, panels of various materials can be mounted using the disclosed connector devices to cover beams, ducts, or piping in an esthetic, economical, three-dimensional manner. The disclosed connector devices can support loads along inside and outside corners and can be adapted to cover other three-dimensional structures.

The outside and inside connector components of the disclosed corner connector device can be extruded from PVC. In addition, the corner connector device can be manufactured in a wide variety of other materials, depending on the suitability of a material to a particular use. Other features and advantages of the corner connector and components are illustrated in more detail in the attached figures and detailed description.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed corner connector devices represent an advance over prior art devices. The devices provide a corner connector to join and support panels at corners between two room walls, between a ceiling and a wall, or between other non-coplanar surfaces. The disclose devices employ two connector components or strips that can be connected to one another without the need for additional fasteners or separate parts, other than the two connector strips. Also, the disclosed devices can be assembled and installed in a manner that can accommodate both an interior or inside corner and an exterior or outside corner where two non-coplanar surfaces meet at a corner. In addition to being capable of more than one installation orientation, the disclosed devices have a simple, straightforward design, are easy to assemble and install, and are relatively simple and economical to manufacture. The disclosed devices solve a long-felt need for a system that can easily and readily join panels at corners. The disclosed devices also solve a long-felt need for a system that can be configured to enclose beams, pipes, ducts, columns, and similar structures, obstructions, and the like. Wall and ceiling panels and tiles, once mounted using the disclosed devices, are easy to remove, reinstall, replace, swap, and the like. One of the two connector strips can easily be removed from the other to release a panel captured between the two connectors.

Figure 1:
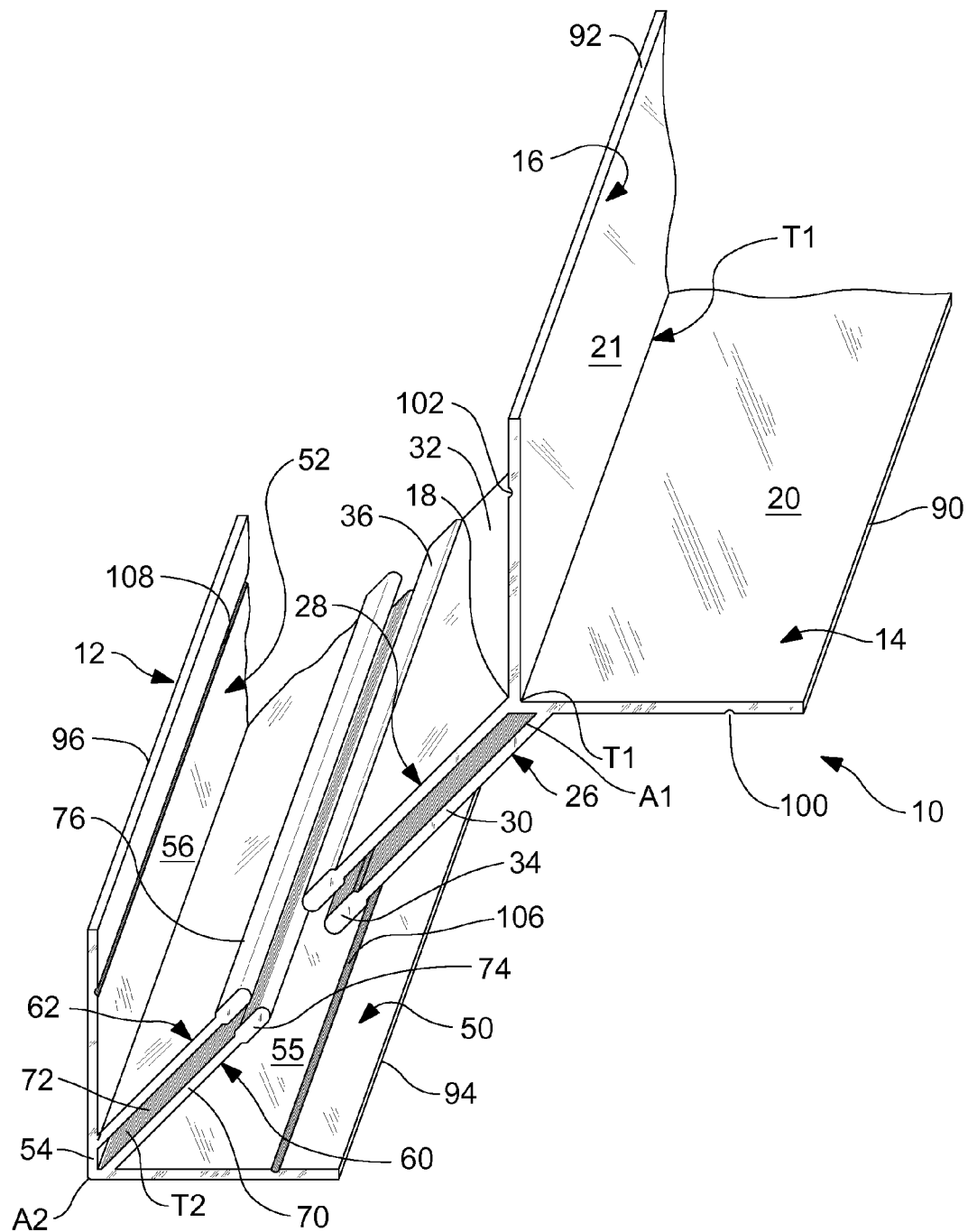
FIG. 1 shows a perspective, lengthwise fragmentary view of one example of a corner connector device according to the teachings of the present invention with the two connector strips disconnected.
Figure 2:
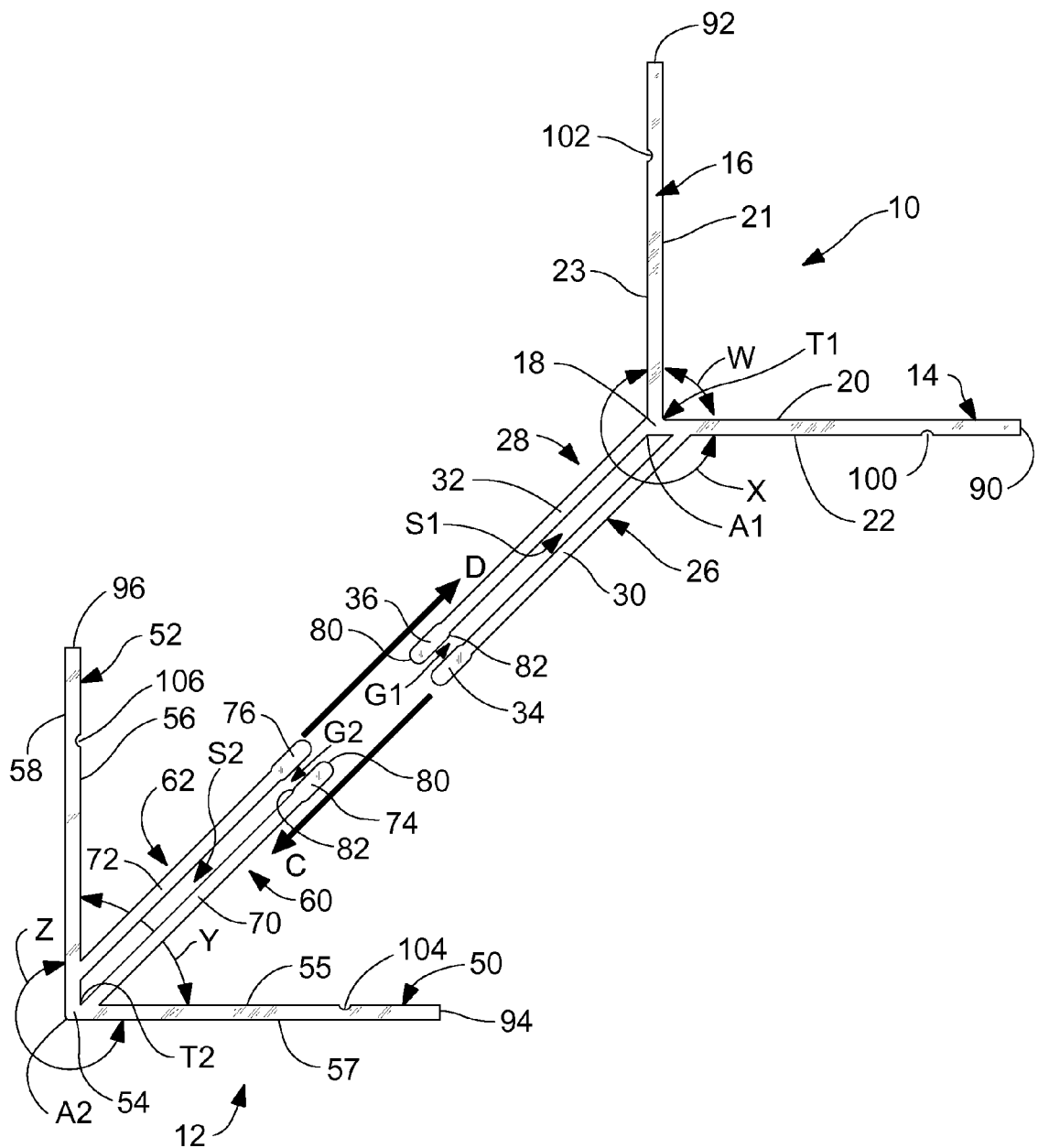
FIG. 2 shows an end view of the disconnected device in FIG. 1.

Turning now to the drawings, FIGS. 1 and 2 illustrate one example of a connector device in accordance with the teachings of the present invention. In this example, the device is disclosed for use on or in corners that have surfaces meeting at right angles. In this example, the connector device has two elongate connector components or strips 10 and 12 that can be cut or trimmed to a desired length. The two strips 10 and 12 can also removably connect to one another and each strip can be mounted to a surface or supporting structure, depending on the application.

The first connector strip 10 in FIGS. 1 and 2 is configured to fit over an outside corner and hereinafter is called an outside connector strip. The outside connector strip 10 is essentially an elongate generally L- or V-shaped channel when viewed in cross section or on end. The channel is defined by a first leg 14 and a second leg 16 that are joined or connected to one another at a joint or seam 18. In this example, a valley or trough T1 of the seam 18 is created at the juncture between inner facing surfaces 20 and 21 of the respective first and second legs 14 and 16. Similarly, a peak or apex A1 of the seam 18 is created at the juncture between outer facing surfaces 22 and 23 of the respective first and second legs 14 and 16.

As noted above, the legs 14 and 16 can be oriented at a 90° or right angle relative to one another. In this example, the 90° angle W is created between the inner facing surfaces 20 and 21 of the legs 14 and 16. As a result, a 270° angle X is created between the outer facing surfaces 22 and 23 of the legs 14 and 16 in this example. Depending on the particular application, it is within the scope and spirit of the invention for the channel angle of the outside connector strip 10 to be greater than or less than 90°, if desired. In any event, the inner facing surfaces will define an angle W less than 180° and the outer facing surfaces will define an angle X greater than 180°. Outside connector strips having other angles can be manufactured for panel installations requiring specific needs, such as joining wall and ceiling panels where the room walls meet a vaulted ceiling. However, as is known in the construction and architectural fields, a majority of wall and ceiling structures are formed with right angle surfaces between wall, ceiling, and/or obstruction surfaces.

Also as shown in FIGS. 1 and 2, the outside connector strip 10 has an outside connector that projects from part of the channel to connect to the other strip 12. In this example, the outside connector includes a plurality of connector flanges that are spaced apart from one another. In this example, the plurality of flanges includes a first outside connector flange 26 and a second outside connector flange 28. As will become evident to those of ordinary skill in the art upon reading this disclosure, more than two outside projecting elements or flanges can be used within the teachings of the present invention. However, in the disclosed example a minimum of two of the connector flanges 26 and 28 is provided in order to connect the strip 10 with the strip 12 as described below. Also, the positioning of the outside flanges may vary from the positions as shown.

Each outside connector flange 26 and 28 has a respective first stem section 30 and second stem section 32 that is attached to the channel. In this example, the stem section 30 of the flange 26 extends from the outside surface 22 of the first leg 14 and is offset a distance from the apex A1 along the surface. The stem section 32 of the flange 28 extends from the outside surface 23 of the second leg 16 very near, but slightly offset from, the apex A1. Each connector flange 26 and 28 is somewhat paddle-shaped and has a respective bead or head section 34 and 36 on the free edge of the corresponding stem 30 and 32. The heads 34 and 36 have a greater thickness than the stems 30 and 32. Thus, a gap G1 between the adjacent heads 34 and 36 is smaller than a spacing or distance S1 between the adjacent stems 30 and 32.

In this example, the connector flanges 26 and 28 are oriented parallel with one another and are oriented at 135° obtuse angles relative to their adjacent legs surface 22 and 23. Thus, the flanges essentially bisect the 270° angle X between the outer facing surfaces 22 and 23 in this example. As needed, the flange angles can also change, if the channel/leg angle is changed to accommodate a particular non-right angle installation application. Additionally, the flanges need not be oriented to bisect the obtuse angle as shown. Also as represented in FIG. 1, the first and second outside connector flanges 26 and 28 extend continuously lengthwise along the channel, as do the first and second legs 14 and 16. The length of the flanges 26 and 28 can be trimmed as the outside connector strip 10 is trimmed to a desired length during installation.

The second corner connector strip 12 in FIGS. 1 and 2 is configured to fit within and inside corner and hereinafter is called an inside connector strip. The inside connector strip 12 is also essentially an elongate channel that is generally L- or V-shaped when viewed in cross section or on end. The channel is defined by a third leg 50 and a fourth leg 52 that are joined or connected to one another at a joint or seam 54. In this example, a valley or trough T2 of the seam 54 is created at the juncture between inner facing surfaces 55 and 56 of the respective third and fourth legs 50 and 52. Similarly, a peak or apex A2 of the seam 54 is created at the juncture between outer facing surfaces 57 and 58 of the respective third and fourth legs 50 and 52.

As with the strip 10, the legs 50 and 52 can be oriented at a 90° or right angle relative to one another. In this example, the 90° angle Y is created between the inner facing surfaces 55 and 56 of the legs 50 and 52. As a result, a 270° angle Z is created between the outer facing surfaces 57 and 58 of the legs 50 and 52 in this example. Depending on the particular application, it is within the scope and spirit of the invention for the channel angle of the inside connector strip 12 to be greater than or less than 90°, if desired. In any event, the inner facing surfaces will define an acute angle Y less than 180° and the outer facing surfaces will define an angle Z greater than 180°. Inside connector strips having other angles can be manufactured for panel installations requiring specific needs, such as joining wall and ceiling panels where the room walls meet a vaulted ceiling, as noted above.

As further shown in FIGS. 1 and 2, the inside connector strip 12 has an inside connector that projects from part of the channel to connect to the other strip 10. In this example, the inside connector includes a plurality of inside connector flanges that project from part of the channel and that are spaced apart from one another. In this example, the plurality of flanges includes a third inside connector flange 60 and a fourth inside connector flange 62. As will become evident to those of ordinary skill in the art upon reading this disclosure, more than two inside projecting elements or flanges can be used within the teachings of the present invention. However, in the disclosed example a minimum of two of the inside connector flanges 60 and 62 are provided in order to connect the strip 12 with the strip 10 as described below. In one alternative example, one of the two connector strips 10, 12 could be provided with only a single flange that connects with a pair of the flanges on the other strip. Also, the positioning of the flanges on the strip 12 may vary from the positions as shown.

Each inside connector flange 60 and 62 has a respective third stem section 70 and fourth stem section 72 that is attached to the channel. In this example, the stem section 70 of the flange 60 extends from the inside surface 55 of the third leg 50 very near, but slightly offset from, the apex A2. The stem section 72 of the flange 62 extends from the inside surface 56 of the fourth leg 52 and is offset a distance from the apex A2 along the surface. Each connector flange 60 and 62 is also somewhat paddle-shaped and has a respective bead or head section 74 and 76 on the free edge of the corresponding stem 70 and 72. The heads 74 and 76 have a greater thickness than the stems 70 and 72. Thus, a gap G2 between the adjacent heads 74 and 76 is smaller than a spacing or distance S2 between the adjacent stems 70 and 72.

As discussed in greater detail below, the sizes, shapes, spacing, and gap of the first and second outside flanges 26 and 28 match the sizes, shapes, spacing, and gap of the third and fourth flanges 60 and 62. In this example, the connector flanges 60 and 62 are also oriented parallel with one another. However, the inside connector flanges 60 and 62 are oriented at 45° acute angles relative to their adjacent legs surface 55 and 56. Thus, the flanges essentially bisect the acute 45° angle between the outer facing surfaces 55 and 56 in this example. As with the strip 10, the flange angles can also change, if the channel/leg angle of the inside connector strip 12 is changed to accommodate a particular non-right angle installation application. Also, the flanges need not be oriented to bisect the acute angle as shown. The third and fourth inside connector flanges 60 and 62 also extend continuously lengthwise along the channel, as do the third and fourth legs 50 and 52. The length of the flanges 60 and 62 can be trimmed as the inside connector strip 12 is trimmed to a desired length during installation.

As shown in FIG. 2, the connector strips 10 and 12 can be connected to one another by pushing the inside connector flanges 26, 28 toward the outside connector flanges 60 and 62 together in the direction of Arrow C. Similarly, the strips 10 and 12 can be disconnected from one another by pulling their respective flanges apart in the direction of the Arrow D. To facilitate connection in the Arrow C direction, each bead or head 34, 36, 74, 76 has a rounded end or tip 80. To facilitate disconnection in the Arrow D direction, each bead or head 34, 36, 74, 76 has ramps 82 that provide angled transition surfaces between the thicker heads and the respective thinner stem sections 30, 32, 70, 72 as discussed further below. The flanges 26, 28, 60, 62 are resiliently flexible such that each pair can be moved or displaced apart.

Figure 3:
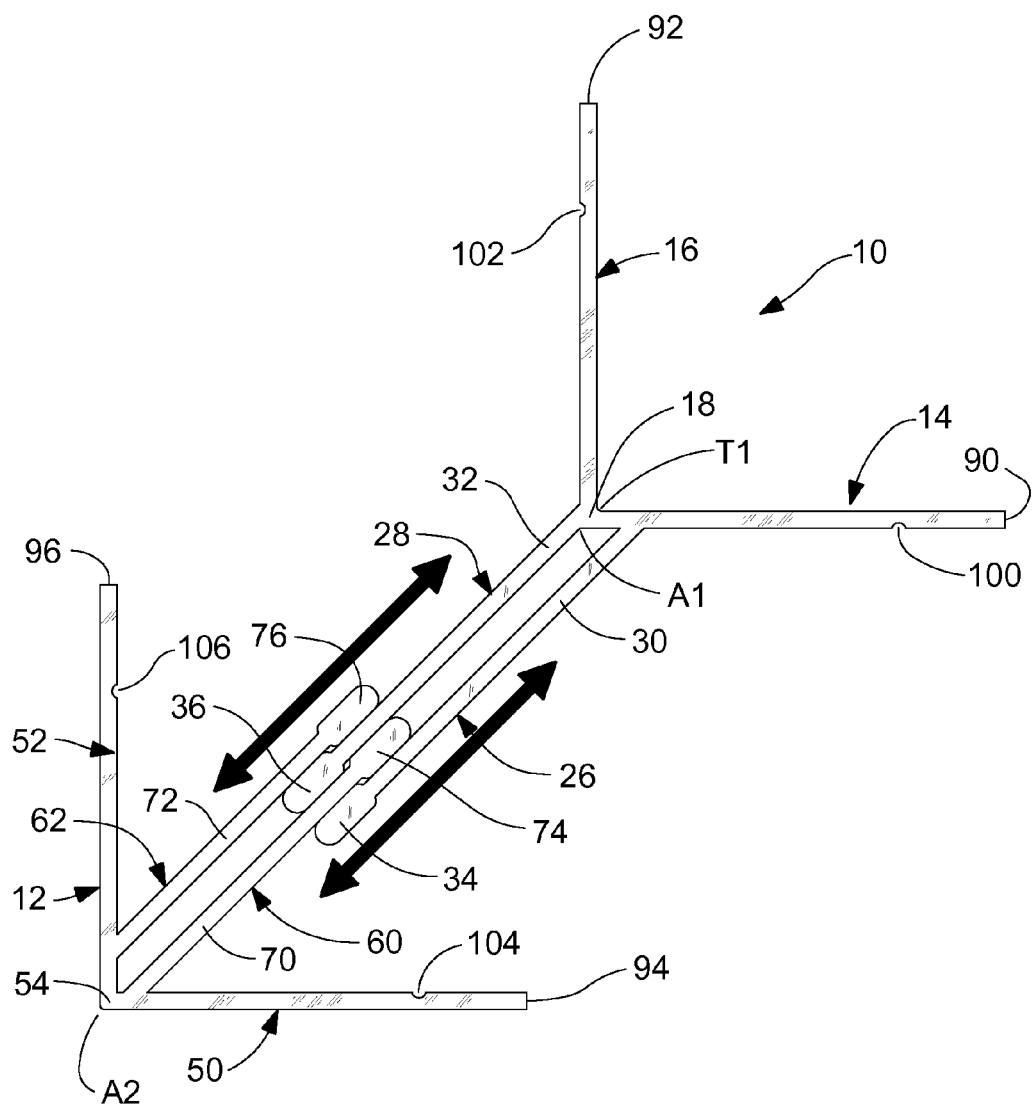
FIG. 3 shows the device of FIG. 2 in an assembled condition with the two connector strips connected to one another and expanded to a maximum panel space condition.

Referring now to FIG. 3, the inside and outside connector strips 10, 12 are shown connected to one another. In this example, the positioning of the connector flanges 26 and 28 relative to the apex A1 on the outside strip 10 is offset in the opposite direction to the positioning of the connector flanges 60 and 62 relative to the apex A2 on the inside connector strip 12. This offset differential aligns or centers the two connector strips 10, 12 relative to one another when connected. In the disclosed example, the head or bead 36 of the outside connector flange 28 is positioned between the heads 74, 76 of the inside connector flanges 60, 62. The head or bead 74 of the inside connector flange 60 is likewise positioned between the heads 34, 36 of the outside connector flanges 26, 28. As the two strips 10, 12 are pushed together, the rounded tips 80 of the heads 36 and 74 push between the flanges 60, 62 and 26, 28, respectively, to pass through the gaps G2 and G1 as shown in FIG. 2. The heads 36 and 74 will then seat in the spaces S2, S1 between the opposing pair of flanges after passing beyond the corresponding heads.

In this example, the spaces S1 and S2 are sized to essentially match the thickness of the heads. The head and space size, along with the resiliency of the flanges 26, 28, 60, and 62, allows the flanges to return to their essentially parallel orientations once the strips 10 and 12 are connected. In FIG. 3, the two connector strips 10 and 12 are depicted in a position just after the heads 76 and 34 have seated in the flange spaces S1 and S2. This position defines a maximum panel thickness position for the connector device. If the two strips 10 and 12 are pulled apart beyond this maximum position, the heads 34 and 76 will return through the gaps G2, G1 and the strips will separate. Once in the maximum position, the two strips 10 and 12 can also be pushed further together until one of the heads bottoms out against the opposite strip. This bottomed out position defines a minimum panel thickness position for the connector device.

In this example, the head 34 of flange 26 bottoms out when in a minimum position. Nonetheless, the length of the flanges could vary, and, if of sufficient length, one or the other of flanges 60, 62 could bottom out. Furthermore, the two connector strips 10, 12 could be connected in a non-align position, wherein, for example, the head 34 of flange 26 could be seated between flanges 60, 62, provided that the legs are of sufficient length to capture and support a panel.

In this example, the corner connector device including the connector strips 10 and 12 are intended for installation of panels such as ceiling panels or tiles, wall panels, and the like. The spacing between the connector strips 10 and 12 so that they can be positioned relative to one another anywhere between the maximum and minimum panel thickness positions. This can be done to accommodate different sized panels. Also, in many situations it may be impracticable to have two tightly connected strips. Many building structures and building materials, including ceiling tiles and wall and ceiling panels, have dimensional irregularities. The positional adjustment capability between the connector strips 10 and 12 of the disclosed connector device can accommodate such irregularities.

Figure 4:
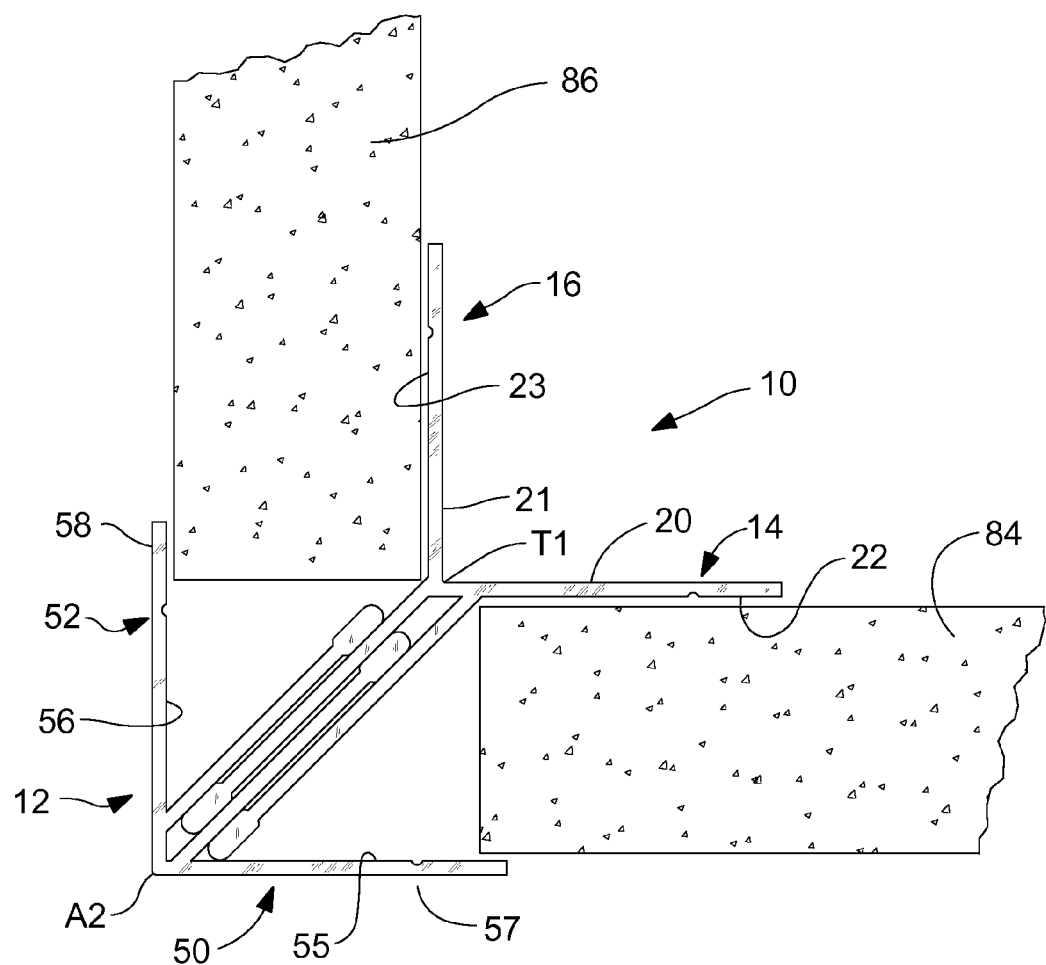
FIG. 4 shows an end view of the assembled device in FIG. 3 with the connector strips in a minimum panel space condition and with panels captured between the connector strips.

Referring now to the configuration in FIG. 4, panels 84 and 86 are shown captured by the engaged connected strips 10 and 12 of FIG. 3. The panel 84 is captured between the outside surface 22 of the leg 14 on the outside connector strip 10 and the inside surface 55 of the leg 50 on the inside connector strip 12. These surfaces 22, 55, and thus the legs 14, 50, at least partly confront or overlie one another to capture both sides of the panel. Similarly, the panel 86 is captured between the outside surface 23 of the leg 16 on the outside connector strip 10 and the inside surface 56 of the leg 52 on the inside connector strip 12. These surfaces 23, 56, and thus the legs 16, 52, at least partly confront or overlie one another to capture both sides of the panel 86.

The spacing between the confronting surfaces 22, 55 and 23, 56 can be adjusted between the maximum and minimum panel thickness positions as noted above so as to adjust to the panel thickness and to snugly capture the panels, if desired. The term panel is used herein for planar ceiling tiles and wall and ceiling panels, such as the panels 84 and 86. However, it is certainly within the spirit and scope of the present invention that the connector devices support other objects that have a perimeter edge capable of being captured and supported by the strips 10 and 12. Such objects can include artwork, posters, decorative panels, surface relief tiles, or other three-dimensional objects. The term "panel" as used herein is intended to encompass such other objects and the connector device is intended to be capable of supporting such other objects or "panel-like loads."

As will be evident to those having ordinary skill in the art, the dimensions for the various parts of the connector device can vary and yet fall within the spirit and scope of the present invention. The material thickness of the legs and flanges can be varied to alter the load supporting capability of the connector device and the force necessary to connect and disconnect the two strips 10 and 12 of the device. Width of the flanges and legs can also be varied for the same purpose. Also, the various dimensions can be altered to accommodate different thickness panels or tiles. Additionally, the dimensions can be designed so that a specific connector device can have a desired range between the minimum and maximum panel thickness position to accommodate a desired range of panel thicknesses. As used herein, the term length is used to represent the lengthwise dimension along the longitudinal axis of the devices. The length of the strips or components and thus the various parts of these strips can vary considerably. The other dimensions of the strips can be altered to significantly change the functional characteristics of the disclosed devices.

In one example, each head 34, 36, 74, 76 can have a material thickness of approximately 0.095 inches. In one example, each connector flange 26, 28 of the strip 10 can have a width, measured from about the middle of the seam 18 to the head tips 80, of approximately 1.75 inches. In one example, each connector flange 60 and 62 of the strip 12 can also have a width, measured from about the middle of the seam 54 to the head tips 80, of approximately 1.768 inches. In one example, each bead or head 34, 36, 74, 76 can have a width from the tip 80 to the end of each ramp 82 of approximately 0.211 inches. In one example, each stem section 30, 32, 70, 72 of the connector flanges 26, 28, 60, 62 can have a material thickness of approximately 0.07 inches. Each of the legs 14, 16, 50, 52 of each channel has an outer edge 90, 92, 94, 96, respectively. In one example, each leg 14, 16, 50, 52 can have a width from the respective apex A1 or A2 to the corresponding outer edge 90, 92, 94, 96 of approximately 2.0 inches. In one example, each leg 14, 16, 50, 52 can also have a material thickness of approximately 0.08 inches. The gap dimensions G1 and G2 in one example can be approximately 0.030 inches. The spacing dimensions S1 and S2 in one example can be approximately 0.095 inches, which matches the thickness of the heads. When the spacing dimensions S1 and S2 matches the thickness of the heads 34, 36, 74, 76, the heads 34, 36, 74, 76 fit snugly between the stem sections 30, 32, 70, 72 of the flanges 26, 28, 60, 62. By fitting snugly, the connection between the two connector strips 10, 12 is frictionally maintained at the ideal dimension to support a panel of a given thickness that is between a maximum panel thickness and a minimum panel thickness.

Figure 5:
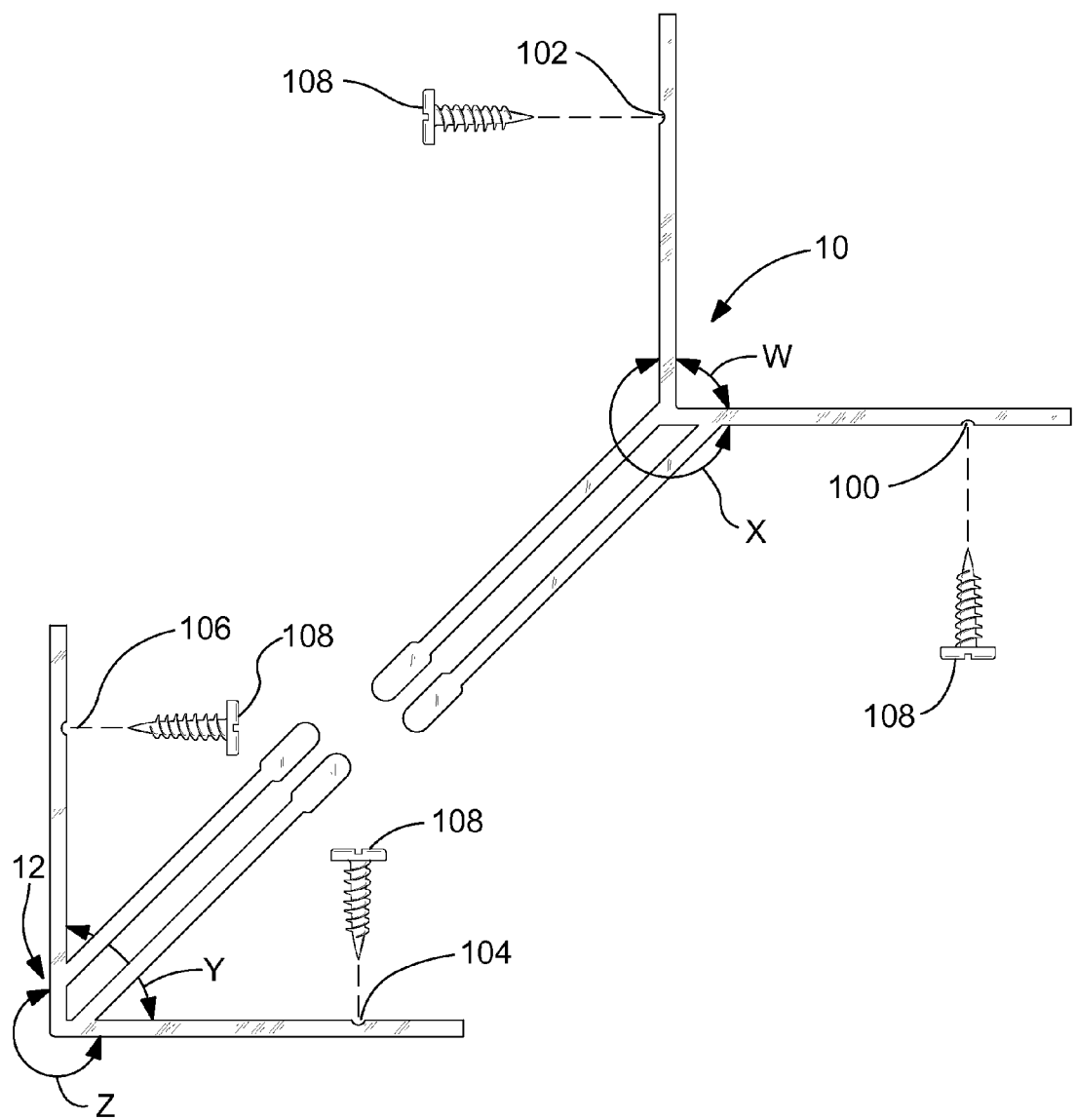
FIG. 5 shows an end view of the disconnected strips in FIG. 2 and fasteners for optionally mounting either one or the other of the strips to a corner.

Each connector strip also has continuous fastener grooves to assist in installation of the connector device. As shown in FIGS. 1-3 and 5, the outside connector strip 10 has fastener grooves 100, 102 formed lengthwise along the outside surfaces 22, 23 on the first and second legs 14, 16, respectively. Similarly, the inside connector strip 12 has fastener grooves 104, 106 formed lengthwise along the inside surfaces 55, 56 on the third and fourth legs 50, 52, respectively. As represented in FIG. 5, conventional screws 108 or other fasteners can be aligned with one of the grooves anywhere along the length of the connector device. The grooves will help assist one in properly positioning and in holding the fastener in position during installation.

Because the grooves are continuous in this example, an installer can install the connector device using any number of fasteners desired and at virtually any location along the length of the device, as needed. This can allow the device to support a relatively heavy panel load if needed and can minimize product waste caused by trimming during installation. An installer can place screws 108 at intervals along the longitudinal length of the grooves 100, 102, 104, 106, as necessary. For example, structural elements such as wall studs, furring strips, and floor or ceiling joists are very often found at regular 16 inch center-to-center intervals. However, typical center intervals can range from less than 16 inches to 24 inches and more. The disclosed connector devices can accommodate virtually any installation application.

In addition, virtually any type of fastener can be utilized to install the disclosed connector devices. In one example, the screws 108 can be a drywall, self-tapping fastener, which are well known and available at nearly any building materials outlet or hardware store. Drywall screws have been shown to penetrate plastic materials such as polyvinylchloride (PVC) without cracking the plastic. The disclosed connector strips can also be fabricated from a variety of materials and processes, as long as the connector flanges have some resiliency and flexibility for connection and disconnection and the device is capable of adequately supporting loads, as desired. In one example, the connector strips 10 and 12 can be formed having a fire retardant characteristic, even if formed from a plastic material, which can yield an important marketing advantage.

In one example, the strips 10 and 12 can be continuously extruded from PVC or other suitable plastic materials. The devices can be trimmed upon extrusion to desired lengths for commercial sale and shipping and then further trimmed by an installer on the job as needed. In other examples, the connector strips 10 and 12 can be formed of wood, metal, paper, paperboard, cardboard, rubber, and the like. Fibrous composites such as Kevlar or fiberglass are also perhaps suitable. However, PVC can be economically extruded into the disclosed shapes by plastics fabricators that are skilled in the art of plastic extrusions. A continuous and appropriately sized and shaped connector strip can then be trimmed to standard or custom lengths.

Figure 6:
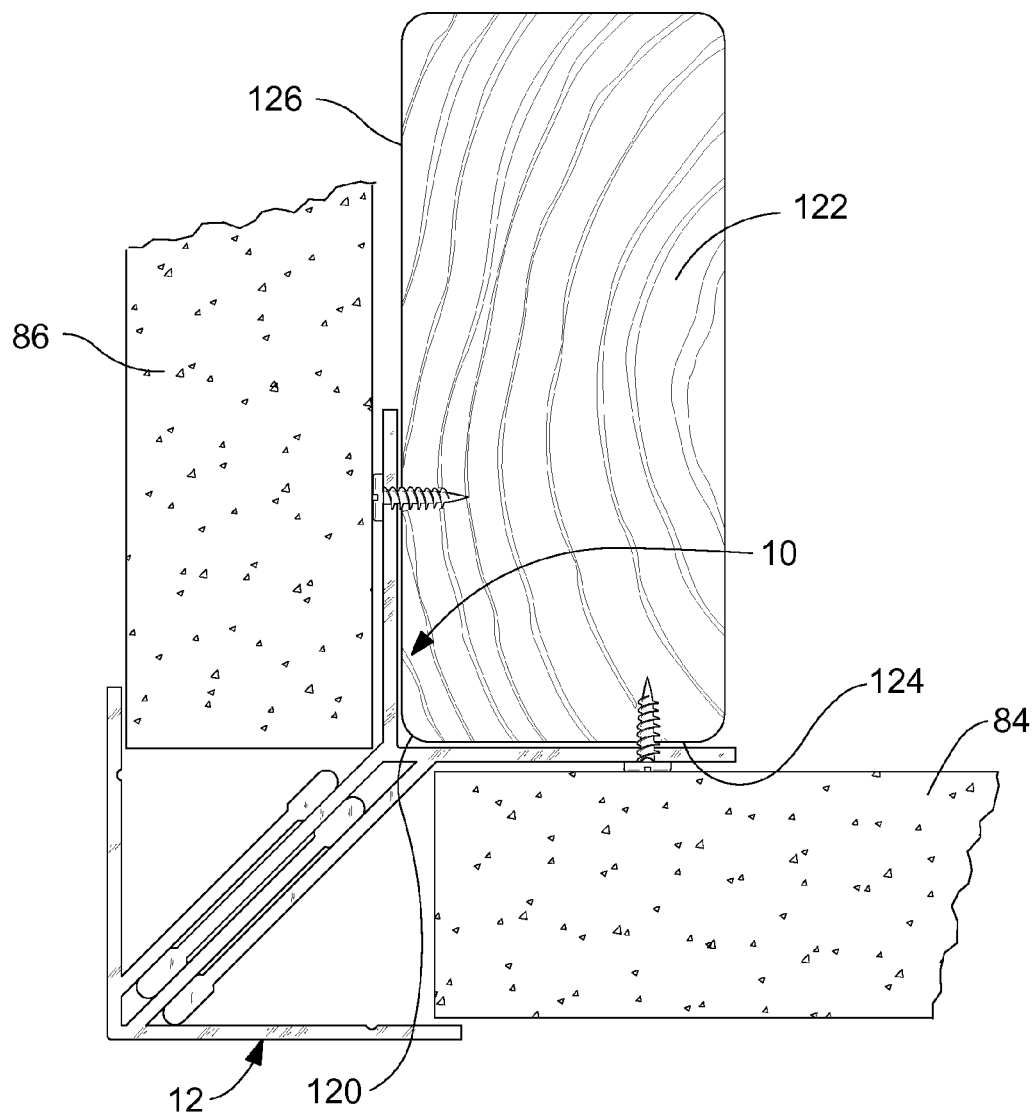
FIG. 6 shows a cross section view of the assembled device in FIG. 5 and mounted to an outside or exterior corner.

In one example illustrated in FIG. 6, the connector device as depicted in FIG. 4 can be mounted to create an outside corner joint between adjacent panels 84 and 86. In this example, an installer would trim to length an outside corner strip 10. The installer then would place the trimmed strip 10 with the trough T1 facing an exposed outer corner 120 of a structural object 122, such as a stud in this example. The strip's inside surface 20 of the leg 14 abuts a surface 124 of the stud 122 and the inside surface 21 of the leg 16 abuts a surface 126 of the stud. Fasteners 108 are then installed through the grooves 100 and 102 to secure the trimmed strip in place on the stud 122 (See FIG. 5). The panels 84 and 86 can then be positioned against the respective exposed outside leg surfaces 22 and 23. The inside connector strip 12 can then be connected to the strip 10 as discussed above to capture the panels in place. The outside corner arrangement in FIG. 6 can represent either a vertical wall corner or a horizontal ceiling structure corner.

Figure 7:
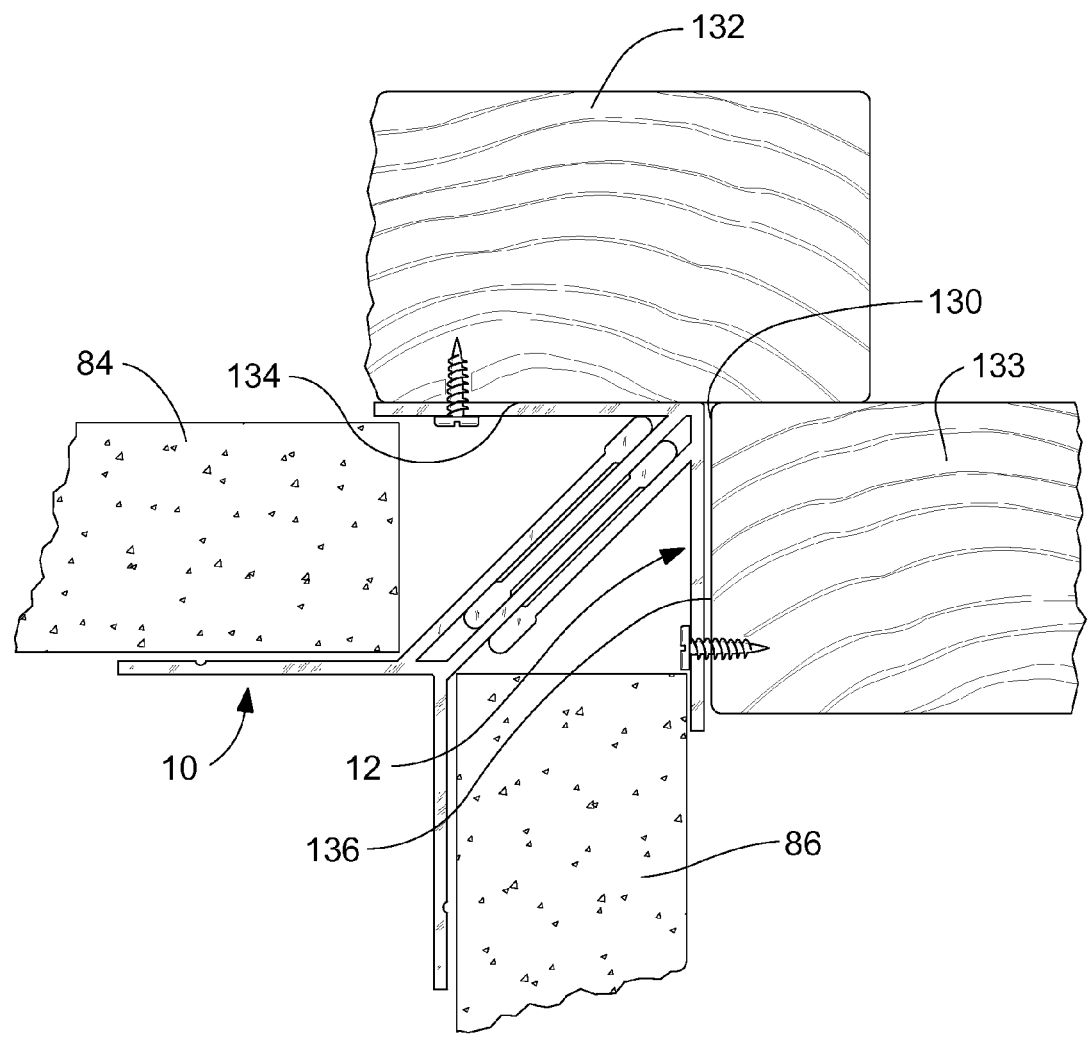
FIG. 7 shows a cross section view of the assembled device in FIG. 5 and mounted to an inside or interior corner.
Figure 8:
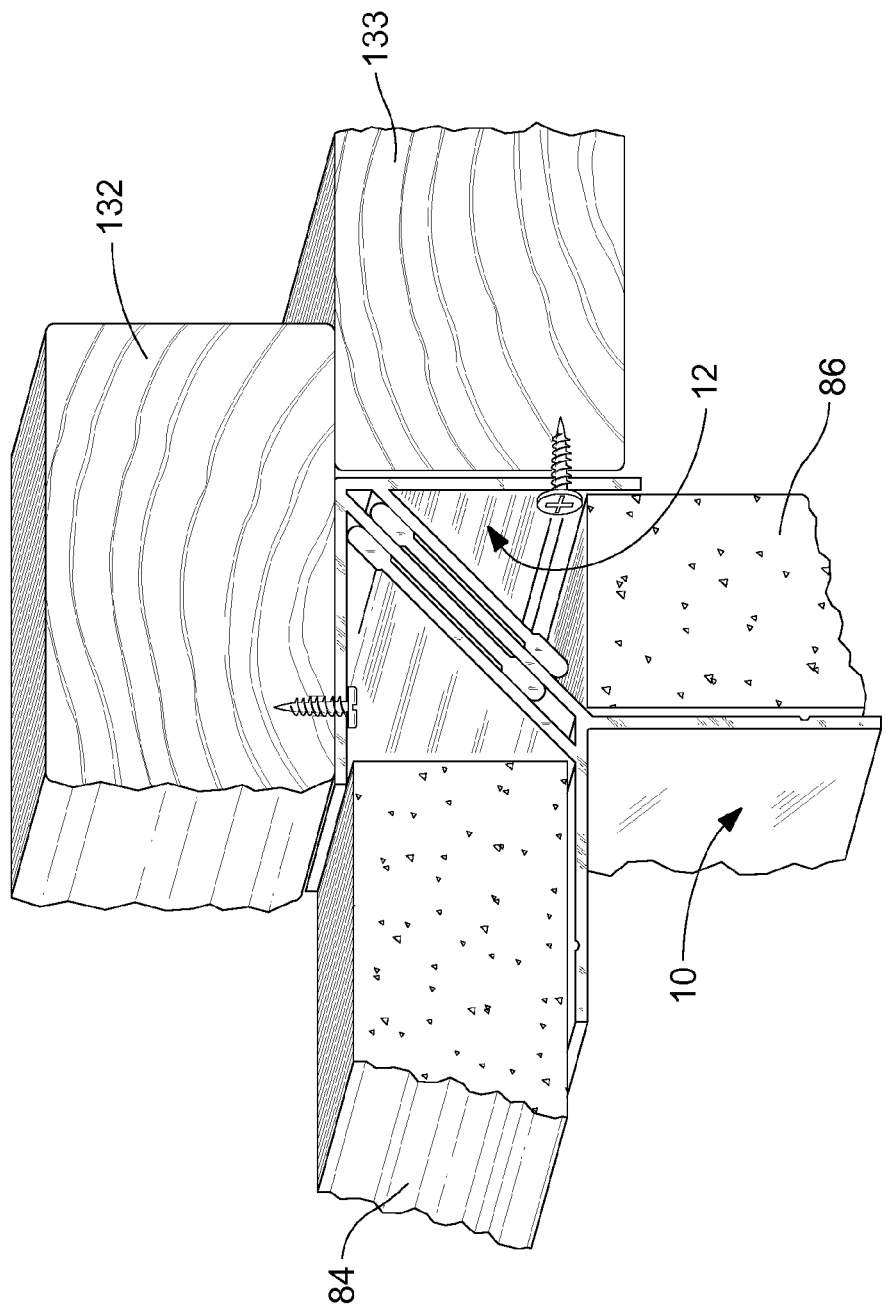
FIG. 8 shows a perspective view of the installed device in FIG. 7.

In another example illustrated in FIGS. 7 and 8, the connector device as depicted in FIG. 4 can also be mounted to create an inside corner joint between adjacent panels 84 and 86. In this example, an installer would trim to length an inside corner strip 12. The installer then would place the trimmed strip 12 with the apex A2 facing an exposed inner corner 130 of a structural object, such as adjoining studs 132, 133 in this example. The strip's outside surface 57 of the leg 50 abuts a surface 134 of the stud 132 and the outside surface 58 of the leg 52 abuts a surface 136 of the stud 133. Fasteners 108 are then installed through the grooves 104 and 106 to secure the trimmed strip 12 in place on the studs 132, 133 (See FIG. 5). The panels 84 and 86 can then be positioned against the respective exposed inside leg surfaces 55, 56. The outside connector strip 10 can then be connected to the strip 12 as discussed above to capture the panels in place. The inside corner arrangement in FIG. 7 can also represent either a vertical wall corner, a wall to ceiling corner joint, or a horizontal ceiling structure corner.

Figure 9:
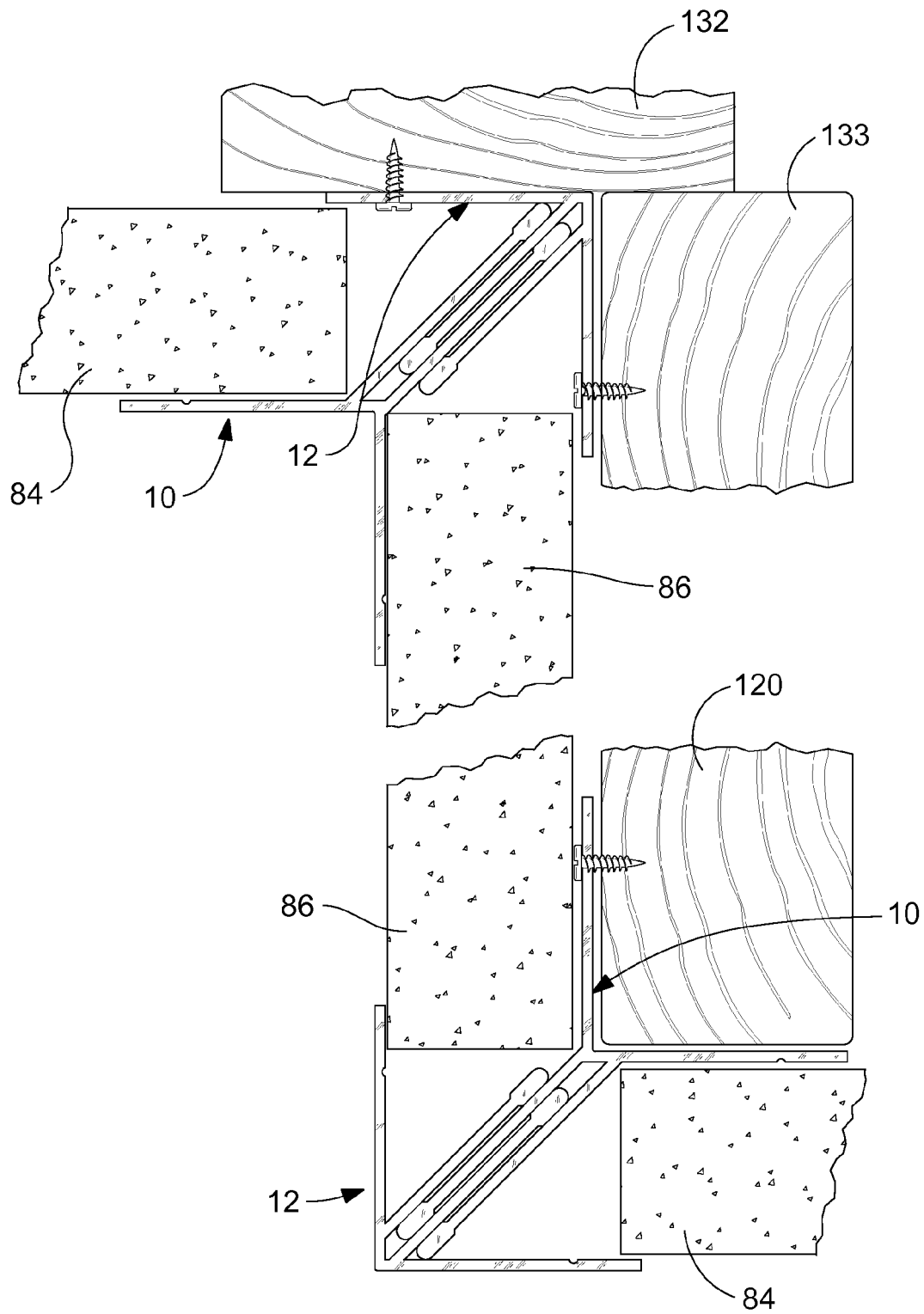
FIG. 9 shows a fragmentary end view of a combination of the devices in FIGS. 6 and 7 mounted to circumvent an exterior or outside corner and an adjacent interior or inside corner.
Figure 10:
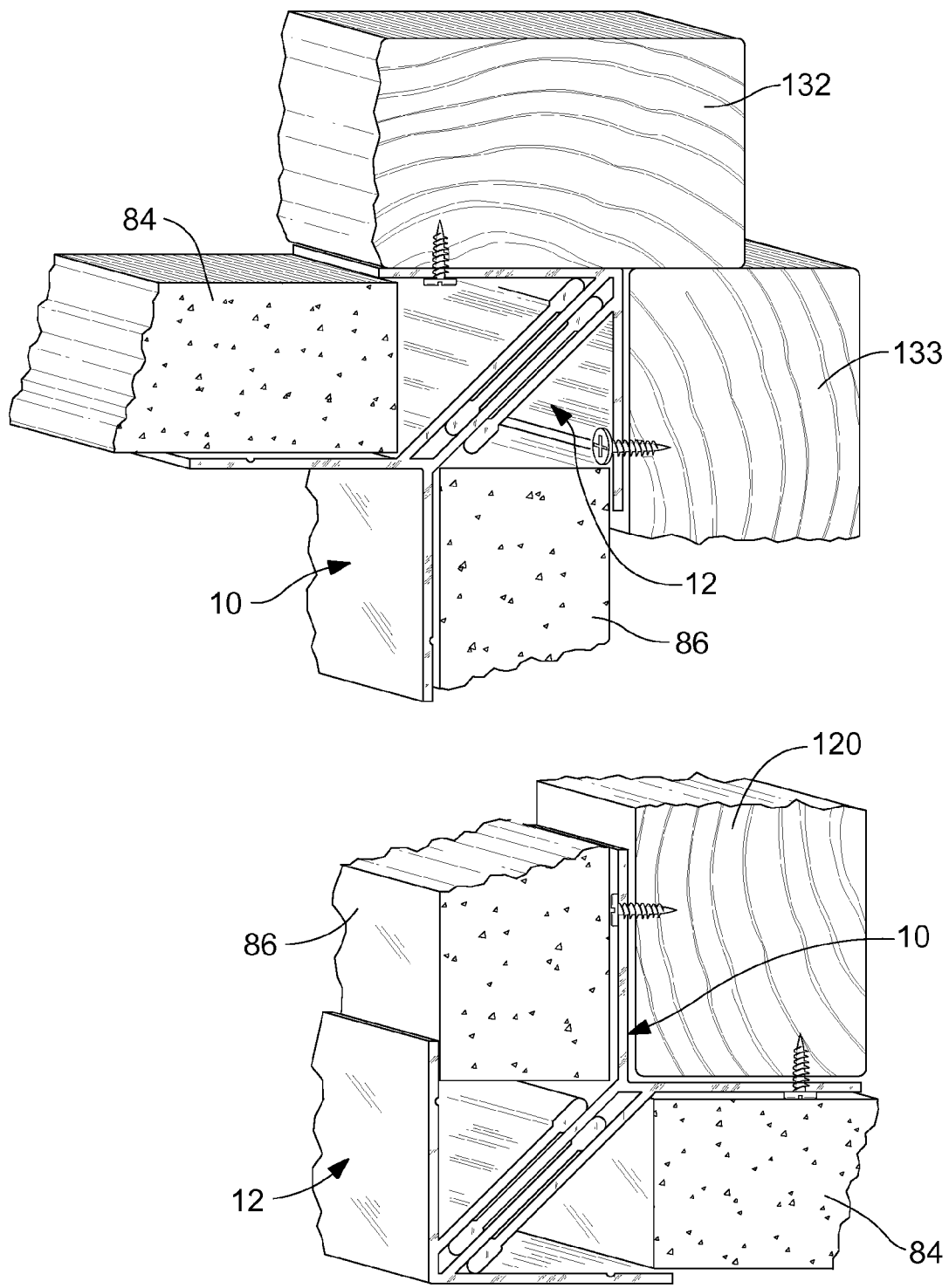
FIG. 10 shows a perspective view of the device and panel arrangement in FIG. 9.
Figure 11:
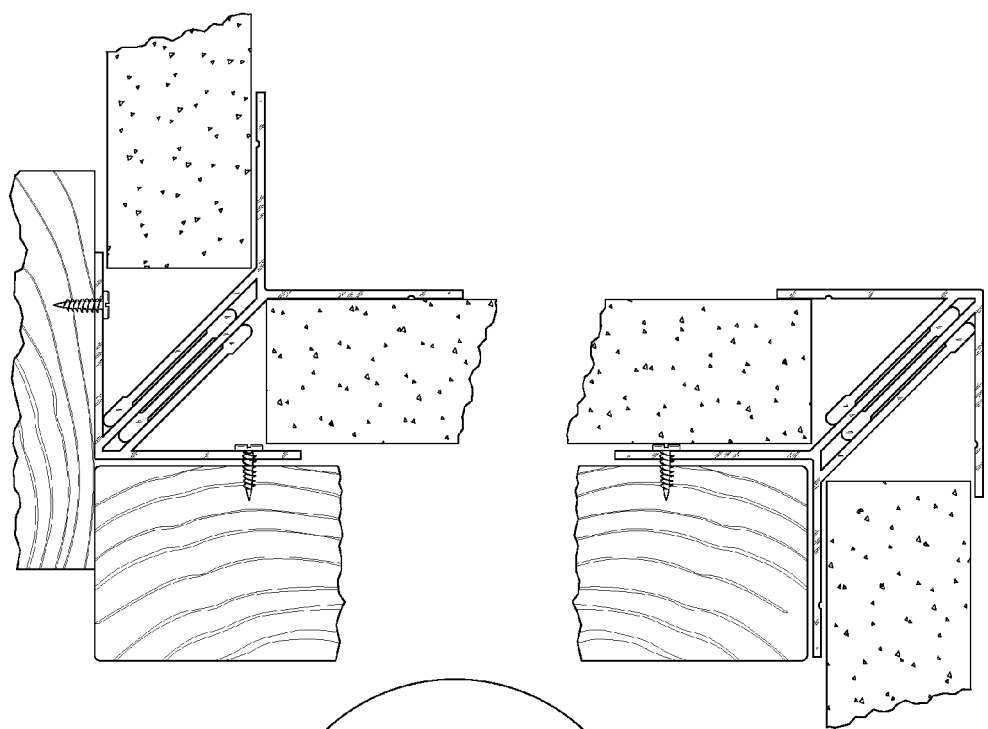
FIG. 11 shows a cross section of multiple assembled devices in FIGS. 6 and 7 configured to accommodate an obstruction displaced from a flat wall or ceiling.
Figure 11:
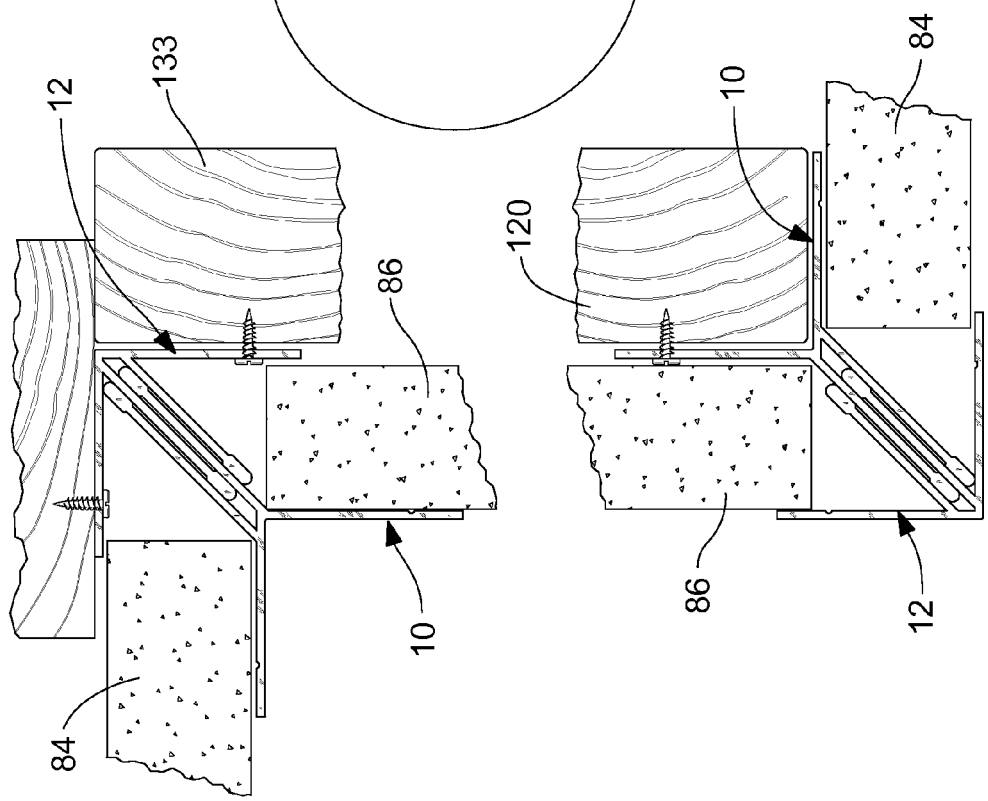

In another example, FIGS. 9 and 10 illustrate a combination of the arrangements in FIGS. 6-8. This arrangement can be employed in a horizontal orientation to enclose a kitchen or other type of soffit or to enclose one side of a ceiling obstruction such as an exposed water or steam pipe or a beam. The opposite side of such an obstruction can be configured as a mirror image arrangement of the connector devices and panels as seen in FIG. 11. These arrangements can also be employed in a vertical orientation to enclose wall obstructions such as an exposed water pipe or air duct. These embodiments could be used in varying combinations to conform to the corners formed by other structural arrangements as well. In one example, four of the outside arrangements shown in FIG. 6 can be employed to fully enclose a completely exposed heating duct or all sides of a support column in a basement or attic environment. The disclosed devices can be employed in the various configurations to create a pleasing appearance within an office, recreational, or industrial area to hide structural features.

Figure 12:
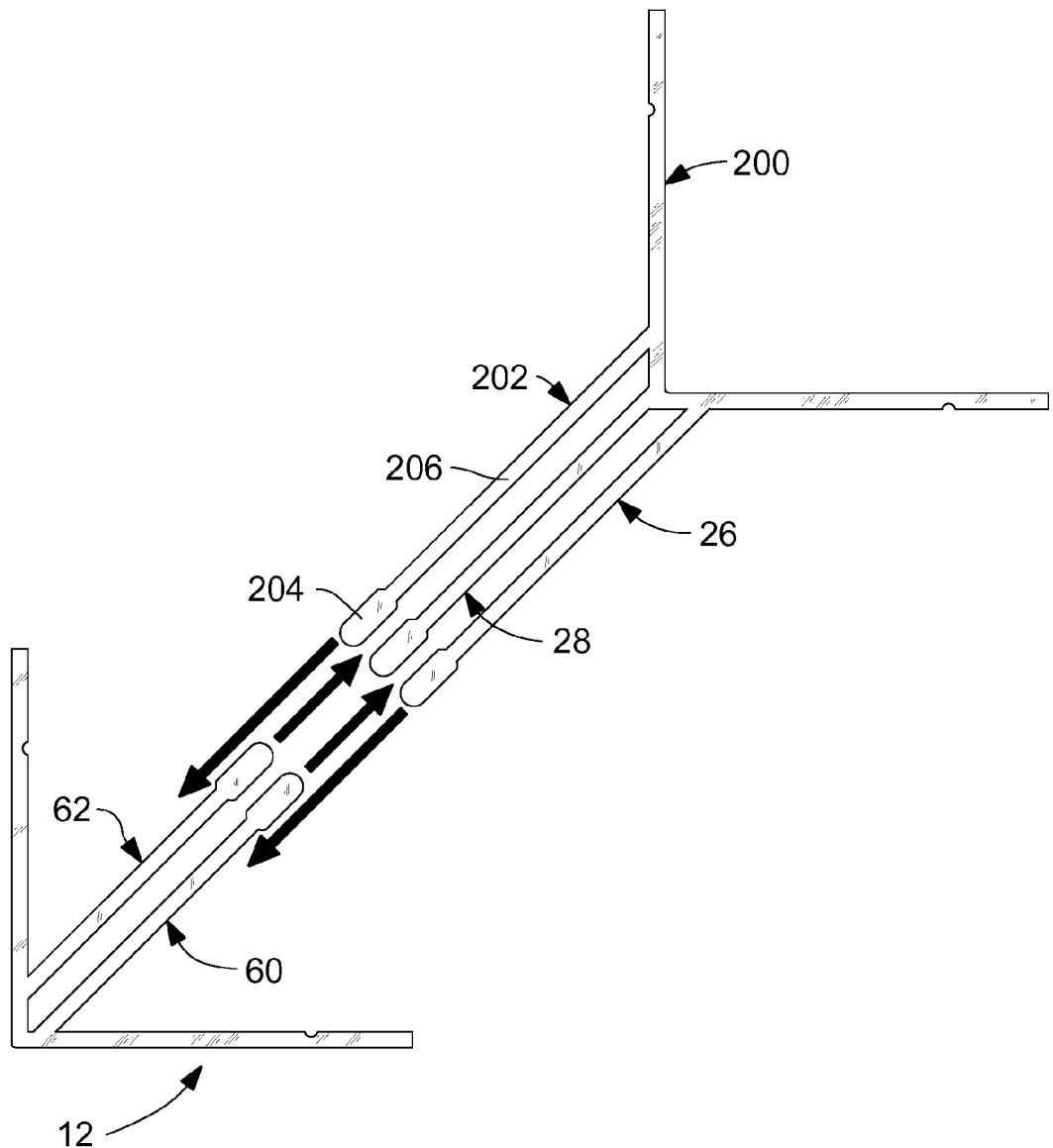
FIG. 12 shows an end view of an alternative example of a corner connector device according to the teachings of the present invention.

An alternative example of a connector device is shown in FIG. 12. In this example, the inside connector strip 12 is identical to that described previously with respect to FIGS. 1-11. The outside connector strip 200 shown in FIG. 12 is also nearly identical to the described above outside strip 10. However, in this example, the strip 200 includes a fifth connector flange 202 that has a head or bead 204 and a stem section 206. In this example, the flanges 60 and 62 of the inside connector strip each seat between a pair of the connector flanges 26, 28, 200 when the strips 200 and 12 are connected in a manner as described above.

Figure 13:
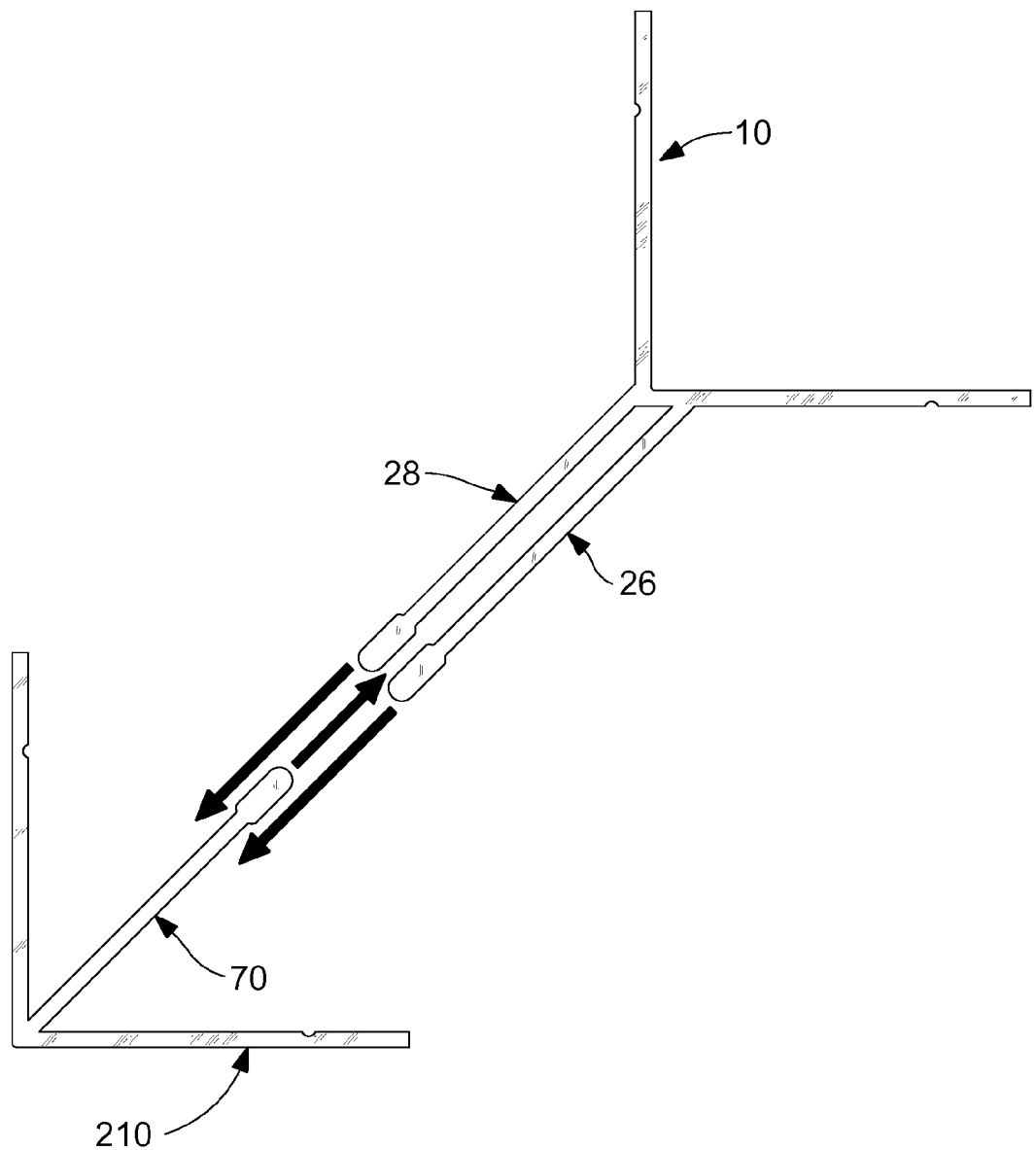
FIG. 13 shows an end view of another alternative example of a corner connector device according to the teachings of the present invention.

FIG. 13 shows yet another alternative example of a connector device. In this example, the outside connector strip 10 is identical to that described previously with respect to FIGS. 1-11. In this example, the inside connector strip 210 has only the third connector flange 70. The fourth connector flange 72 has been eliminated. In this example, the single flange 70 seats between the pair of flanges 26 and 28 when the strips 10 and 210 are connected in a manner as described above.

The illustrated example in FIGS. 1-11 shows a pair of the connector flanges on each strip 10 and 12. By having two flange pairs, each strip has one flange captured between the pair on the other strip and one flange resiliently pressing against an outside of one of the flanges of the other pair. This mutual engaged flange arrangement can assist in maintain a consistent force applied by each pair of flanges when the device is installed and the strips are connected. This also can significantly increase the force applied by the flanges both to resist disconnection and during connection while permitting the material thickness of any one flange, head, or the like to be relatively minimal. However, as depicted in FIGS. 12 and 13, other flange arrangements are certainly possible. Either one of the components 10 or 12 can have only a single flange, while the other has a pair of flanges. Either one of the components 10 or 12 can have three or more flanges while the other component can have only two or more.

An important consideration in all embodiments is the degree of flexibility required to maintain the engagement of the extending flanges in their respective cavities. For example, metal and plastic corner connectors are well suited for ceiling or wall panel applications. As to manufacturing requirements, a preferred standard length of each corner connector would be approximately eight feet per unit.

Load capacity depends upon the relationship between the flexibility of the material and the resistance to engagement (and disengagement) created by the number of connector flanges and/or the difference in thickness between stem sections and the heads. In other examples, the connector flanges could also be replaced by other types of mechanisms for the inside and outside connectors that permit connection and disconnection of the two strips. The load capacity could be altered depending on the connection mechanism utilized.

In general, the more flexible the material, the less the load which can be supported. However a greater difference in thickness between the stems and paddle-shaped upper ends can compensate for a more flexible material. If the paddle-shaped ends are relatively thicker than the stems 10, then the resistance to engagement or disengagement will be greater.

Although certain corner connector devices, systems, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents. It will be apparent to those of ordinary skill in the art that changes, additions and/or deletions may be made to the disclosed examples without departing from the spirit and scope of the invention. The foregoing description is given for clearness of understanding only, and no unnecessary limitations should be understood therefrom. Modifications within the scope of the invention may be apparent to those having ordinary skill in the art.

What is claimed is:

1. A corner connector device and panel combination, the corner connector device forming a reusable corner joint to support two panels, the combination comprising:
   (A) an outside connector component having a length and, when viewed in cross-section, comprising:
      (a) a first leg and a second leg, the first leg integrally connected to the second leg along a lengthwise seam and forming a channel, the first and second legs each having an inside surface oriented relative to one another at an angle W of less than 180 degrees and each having an outside surface oriented relative to one another at an angle X of more than 180 degrees, and
(b) an outside connector extending lengthwise along the outside connector component parallel to the seam and projecting from one of the outside surfaces;
(B) an inside connector component having a length and, when viewed in cross-section, comprising:
(a) a third leg and a fourth leg, the third leg integrally connected to the fourth leg along a lengthwise seam and forming a channel, the third and fourth legs each having an inside surface oriented relative to one another at an angle Y of less than 180 degrees and each having an outside surface oriented relative to one another at an angle Z of more than 180 degrees, and
(b) an inside connector extending lengthwise along the inside connector component parallel to the seam and projecting from one of the inside surfaces; and
(C) two panel structures,
wherein the inside and outside connectors can be lengthwise selectively connected to and disconnected from one another with confronting parts of the outside surfaces of the outside connector component and inside surfaces of the inside connector component spaced a distance from one another, wherein one of the inside and outside connectors has a pair of connector flanges that are lengthwise spaced apart, and wherein the other of the inside and outside connectors has a connector flange that interferingly fits between the pair of connector flanges when the inside and outside connectors are connected,
wherein the outside connector component has a fastener groove extending lengthwise along each of the outside surfaces of the first and second legs, and wherein the inside connector component has a fastener groove extending lengthwise along each of the inside surfaces of the third and fourth legs,
wherein the outside connector component can be optionally and removably mounted to an outside corner of a structure via fasteners passing through the fastener grooves in the first and second legs and the inside connector component can be connected thereto, the two panel structures supported between the respective confronting parts of the first and third legs and the second and fourth legs forming an outside paneled corner, and
wherein the inside connector component can be optionally and removably mounted to an inside corner of a structure via fasteners passing through the fastener grooves in the third and fourth legs and the outside connector component can be connected thereto, the two panel structures supported between the respective confronting parts of the first and third legs and the second and fourth legs forming an inside paneled corner.

2. A corner connector device and panel combination according to claim 1, wherein the outside connector has a pair of outside connector flanges that are lengthwise spaced apart, and wherein the inside connector has an inside connector flange that interferingly fits between the pair of outside connector flanges when the inside and outside connectors are connected.

3. A corner connector device and panel combination according to claim 2, wherein the inside connector has a pair of the inside connector flanges that are lengthwise spaced apart, and wherein one of the outside connector flanges interferingly fits between the pair of inside connector flanges when the inside and outside connectors are connected.

4. A corner connector device and panel combination according to claim 3, wherein the outside connector has three of the outside connector flanges that are lengthwise spaced apart, and wherein each of the pair of inside connector flanges interferingly fits between adjacent ones of the three outside connector components.

5. A corner connector device and panel combination according to claim 3, wherein the inside connector has three of the inside connector flanges that are lengthwise spaced apart, and wherein each of the pair of outside connector flanges interferingly fits between adjacent ones of the three inside connector flanges.

6. A corner connector device and panel combination according to claim 2, wherein each of the outside and inside connector flanges has a stem section connected to the respective outside and inside connector component and has a head extending along a free edge of the stem section, and wherein each head has a thickness that is greater than a thickness of the corresponding stem section.

7. A corner connector device and panel combination according to claim 6, wherein a spacing between the pair of outside connector flanges matches the head thickness of the inside connector flange.

8. A corner connector device and panel combination according to claim 6, wherein each head has a rounded tip and ramps that transition from sides of the head to adjacent side surfaces of the corresponding stem section.

9. A corner connector device and panel combination according to claim 1, wherein the angles W and Y are about 90° and the angles X and Z are about 270° on the respective inside and outside connector components.

10. A corner connector device and panel combination according to claim 1, wherein the inside surfaces of the first and second legs on the outside connector component are mounted to an exposed, outer, obtuse angled corner of a structure, and wherein the inside connector component is connected to the outside connector component.

11. A corner connector device and panel combination according to claim 10, wherein one of the two panel structures is captured between the outside surface of the first leg and the inside surface of the third leg, and wherein the other of the two panel structures is captured between the outside surface of the second leg and the inside surface of the fourth leg.

12. A corner connector device and panel combination according to claim 1, wherein the outside surfaces of the third and fourth legs on the inside connector component are mounted to an exposed, inner, acute angled corner of a structure, and wherein the outside connector component is connected to the inside connector component.

13. A corner connector device and panel combination according to claim 12, wherein one of the two panel structures is captured between the outside surface of the first leg and the inside surface of the third leg, and wherein the other of the two panel structures is captured between the outside surface of the second leg and the inside surface of the fourth leg.

14. A corner connector device and panel combination according to claim 1, wherein the inside connector comprises a pair of inside connector flanges that are lengthwise spaced apart, and wherein the outside connector comprises at least one outside connector flange that interferingly fits between the pair of inside connector flanges when the inside and outside connectors are connected.

15. A corner connector device and panel combination according to claim 14, wherein each of the inside and outside connector flanges has a stem section connected to the respective inside and outside connector component and a head extending along a free edge of the stem section, and wherein each head has a thickness that is greater than a thickness of the corresponding stem section.

16. A corner connector device and panel combination according to claim 15, wherein a spacing between the pair of inside connector flanges matches the head thickness of the outside connector flange.

17. A corner connector device and panel combination according to claim 15, wherein each head has a rounded tip and ramp that transition from the head thickness to adjacent surfaces of the corresponding stem section.

18. A corner connector device and panel combination according to claim 1, wherein the distance between the confronting parts of the outside surfaces of the outside connector component and inside surfaces of the inside connector component can be adjusted between a minimum panel thickness and a maximum panel thickness position.

19. A corner connector device and panel combination according to claim 1, wherein the outside and inside connector components are extruded from PVC.

20. A corner connector device and panel combination according to claim 1, wherein the first and second legs of the outside connector component are of substantially the same construction as the third and fourth legs of the inside connector component.

21. A corner connector device for supporting panels at a corner of a structure, the corner connector device comprising:

(A) an outside connector component having a length and, when viewed in cross-section, comprising:
  (a) a first leg and a second leg, the first leg integrally connected to the second leg along a lengthwise seam and forming a channel, the first and second legs each having an inside surface oriented relative to one another at an angle W of less than 180 degrees and each having an outside surface oriented relative to one another at an angle X of more than 180 degrees, and
  (b) an outside connector extending lengthwise along the outside connector component parallel to the seam and projecting from one of the outside surfaces; and (B) an inside connector component having a length and, when viewed in cross-section, comprising:
  (a) a third leg and a fourth leg, the third leg integrally connected to the fourth leg along a lengthwise seam and forming a channel, the third and fourth legs each having an inside surface oriented relative to one another at an angle Y of less than 180 degrees and each having an outside surface oriented relative to one another at an angle Z of more than 180 degrees, and
  (b) an inside connector extending lengthwise along the inside connector component parallel to the seam and projecting from one of the inside surfaces, wherein the inside and outside connectors can be lengthwise selectively connected to and disconnected from one another with confronting parts of the outside surfaces of the outside connector component and inside surfaces of the inside connector component spaced a distance from one another for supporting a panel structure between the respective confronting parts of each of the first and third legs and the second and fourth legs, wherein one of the inside and outside connectors has a pair of connector flanges that are lengthwise spaced apart, and wherein the other of the inside and outside connectors has a connector flange that interferingly fits between the pair of connector flanges when the inside and outside connectors are connected, wherein the outside connector component has a fastener groove extending lengthwise along each of the outside surfaces of the first and second legs, and wherein the inside connector component has a fastener groove extending lengthwise along each of the inside surfaces of the third and fourth legs, wherein the outside connector component can be optionally and removably mounted to an outside corner of a structure via fasteners passing through the fastener grooves in the first and second legs and the inside connector component can be connected thereto forming an outside corner joint, and wherein the inside connector component can be optionally and removably mounted to an inside corner of a structure via fasteners passing through the fastener grooves in the third and fourth legs and the outside connector component can be connected thereto forming an inside corner joint.

22. A reusable joint device for supporting panels at a corner of a structure, the joint device comprising:

(A) an outside connector component having a length and, when viewed in cross-section, comprising:
  (a) a first leg and a second leg, the first leg integrally connected to the second leg along a lengthwise seam and forming a channel, the first and second legs each having an inside surface oriented relative to one another at an angle W of less than 180 degrees and each having an outside surface oriented relative to one another at an angle X of more than 180 degrees, and
  (b) an outside connector extending lengthwise along the outside connector component parallel to the seam and projecting from one of the outside surfaces; and (B) an inside connector component having a length and, when viewed in cross-section, comprising:
  (a) a third leg and a fourth leg, the third leg integrally connected to the fourth leg along a lengthwise seam and forming a channel, the third and fourth legs each having an inside surface oriented relative to one another at an angle Y of less than 180 degrees and each having an outside surface oriented relative to one another at an angle Z of more than 180 degrees, and
  (b) an inside connector extending lengthwise along the inside connector component parallel to the seam and projecting from one of the inside surfaces, wherein the inside and outside connectors can be lengthwise selectively connected to and disconnected from one another with confronting parts of the outside surfaces of the outside connector component and inside surfaces of the inside connector component spaced a distance from one another for supporting a panel structure between the respective confronting parts of each of the first and third legs and the second and fourth legs, wherein one of the inside and outside connectors has a pair of connector flanges that are lengthwise spaced apart, and wherein the other of the inside and outside connectors has a connector flange that interferingly fits between the pair of connector flanges when the inside and outside connectors are connected, wherein the outside connector component has a fastener groove extending lengthwise along each of the outside surfaces of the first and second legs, and wherein the inside connector component has a fastener groove extending lengthwise along each of the inside surfaces of the third and fourth legs, wherein either one of the inside or outside connector components can be optionally and removably mounted to a corner of a structure via fasteners passing through the fastener grooves in either the third and fourth legs or the first and second legs, respectively, and the other of the outside or inside connector components can be connected thereto optionally forming either an inside or outside corner joint device, respectively, and wherein the joint device can be disconnected, removed from the corner, and reused to optionally form either one of an inside or outside corner joint device.

* * * * *